United States Patent
Koh et al.

(10) Patent No.: US 11,951,877 B2
(45) Date of Patent: Apr. 9, 2024

(54) ANTI-PINCH CONTROL SYSTEM

(71) Applicant: HYUNDAI TRANSYS INC., Seosan-si (KR)

(72) Inventors: Sang Kyung Koh, Yongin-si (KR); Jae Kwon Son, Hwaseong-si (KR); Won Ho Jung, Seongnam-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 779 days.

(21) Appl. No.: 17/073,962

(22) Filed: Oct. 19, 2020

(65) Prior Publication Data

US 2021/0146801 A1    May 20, 2021

(30) Foreign Application Priority Data

Nov. 15, 2019   (KR) .......................... 10-2019-0146686

(51) Int. Cl.
*B60N 2/02*    (2006.01)
*B60N 2/90*    (2018.01)

(52) U.S. Cl.
CPC ........... *B60N 2/02246* (2023.08); *B60N 2/90* (2018.02)

(58) Field of Classification Search
CPC ............................. B60N 2/90; B60N 2/02246
USPC ........................................................ 701/49
See application file for complete search history.

(56) References Cited

U.S. PATENT DOCUMENTS

| | | | | |
|---|---|---|---|---|
| 2009/0039814 A1* | 2/2009 | Rosch | ................. | H02H 7/0851 |
| | | | | 318/434 |
| 2009/0055055 A1* | 2/2009 | Schussler | ............. | B60N 2/0244 |
| | | | | 701/49 |
| 2016/0280096 A1* | 9/2016 | Bonk | .................... | B60N 2/0228 |
| 2019/0047442 A1* | 2/2019 | Enderich | ............... | B60N 2/206 |
| 2019/0106038 A1* | 4/2019 | Rose | ..................... | B60N 2/0244 |
| 2020/0017000 A1* | 1/2020 | Lee | ......................... | B60N 2/20 |

FOREIGN PATENT DOCUMENTS

| | | |
|---|---|---|
| JP | 2002106256 A | 4/2002 |
| JP | 4370609 B2 | 11/2009 |
| KR | 1020080121557 | 12/2008 |
| KR | 1020110111636 | 10/2011 |
| KR | 1020130039104 A | 4/2013 |
| KR | 1020140187806 | 12/2014 |

\* cited by examiner

*Primary Examiner* — Yazan A Soofi

(57) ABSTRACT

The present disclosure relates to an anti-pinch control system. The anti-pinch control system includes a motor configured to generate driving force for moving a seat of a vehicle, a current measurement sensor configured to measure a value of the current generated by the motor, a database unit configured to store the values of current measured by the current measurement sensor, and a controller configured to vary an anti-pinch value of the seat based on an average of a plurality of values of current measured every preset measurement period for a predetermined time, stored in the database unit, wherein the plurality of values of current is values of current measured before the predetermined time based on a current time.

7 Claims, 6 Drawing Sheets

[FIG. 1]

[FIG. 3]
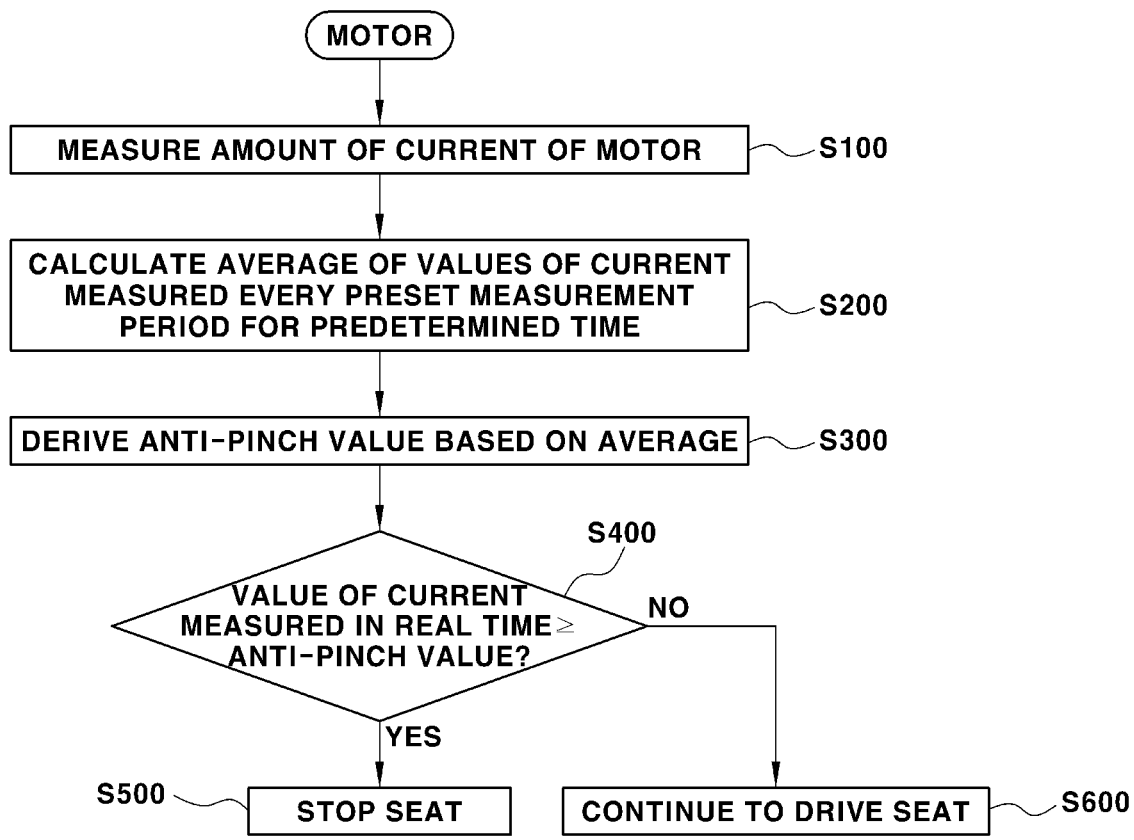

[FIG. 4]
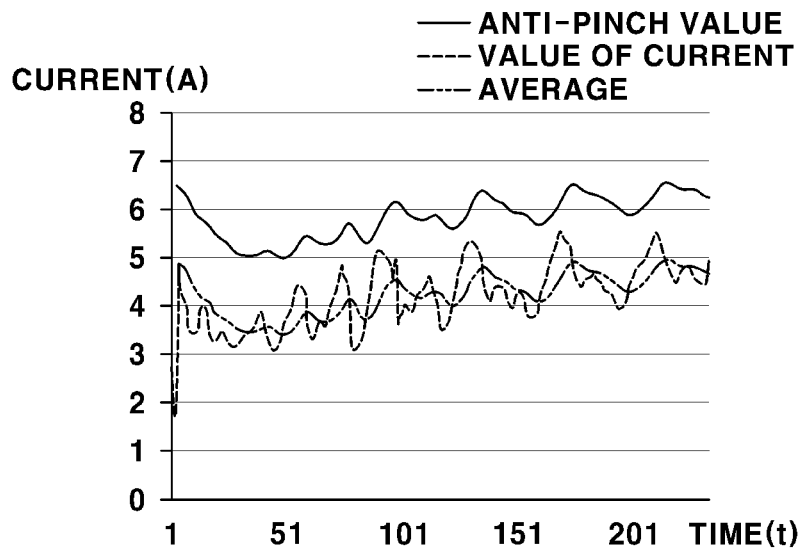
[FIG. 5]
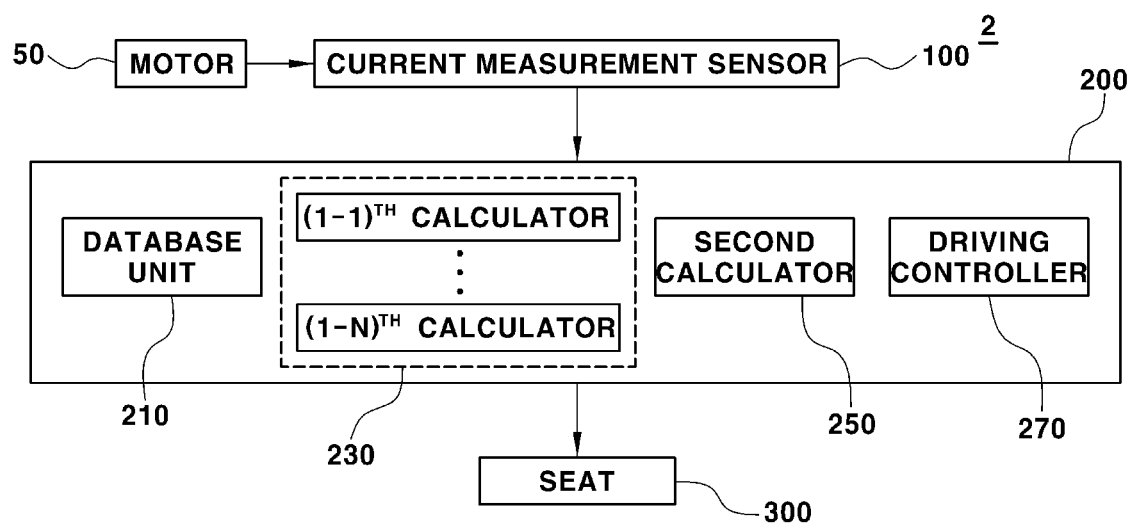

[FIG. 6A]
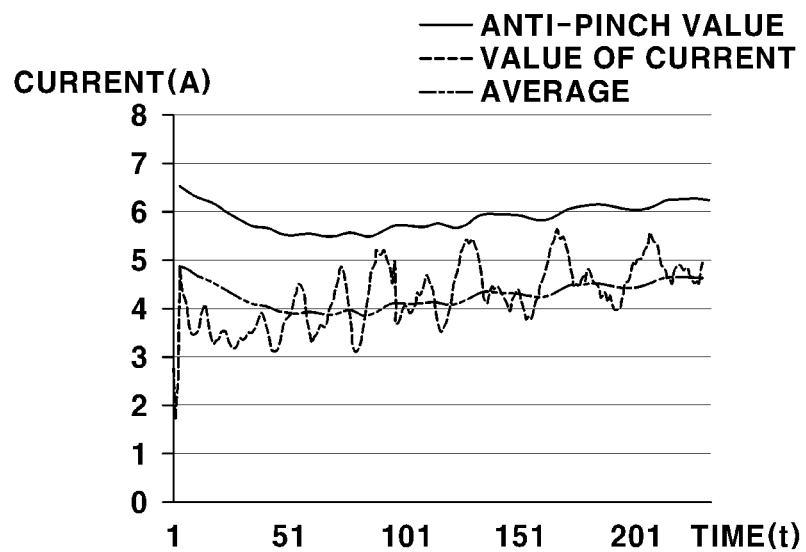
[FIG. 6B]
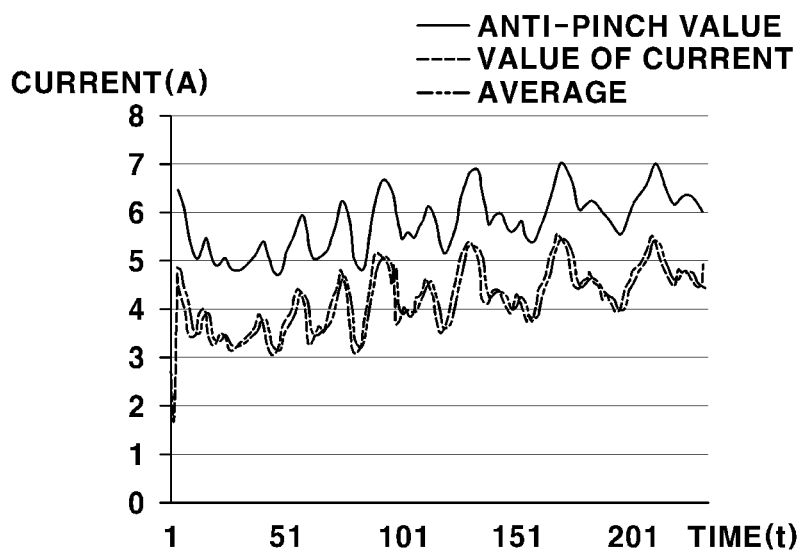

[FIG. 6C]
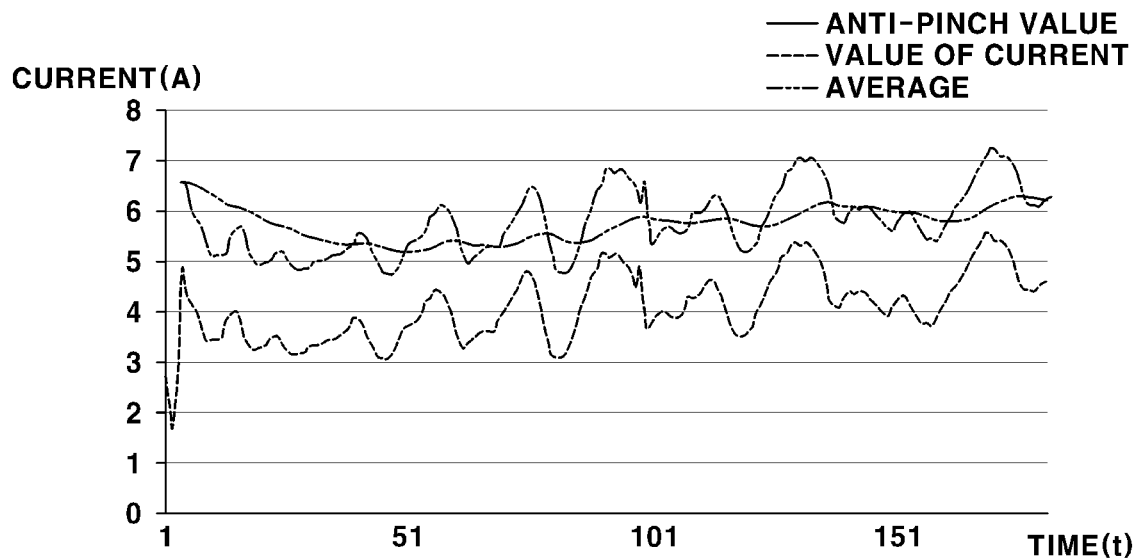
[FIG. 6D]
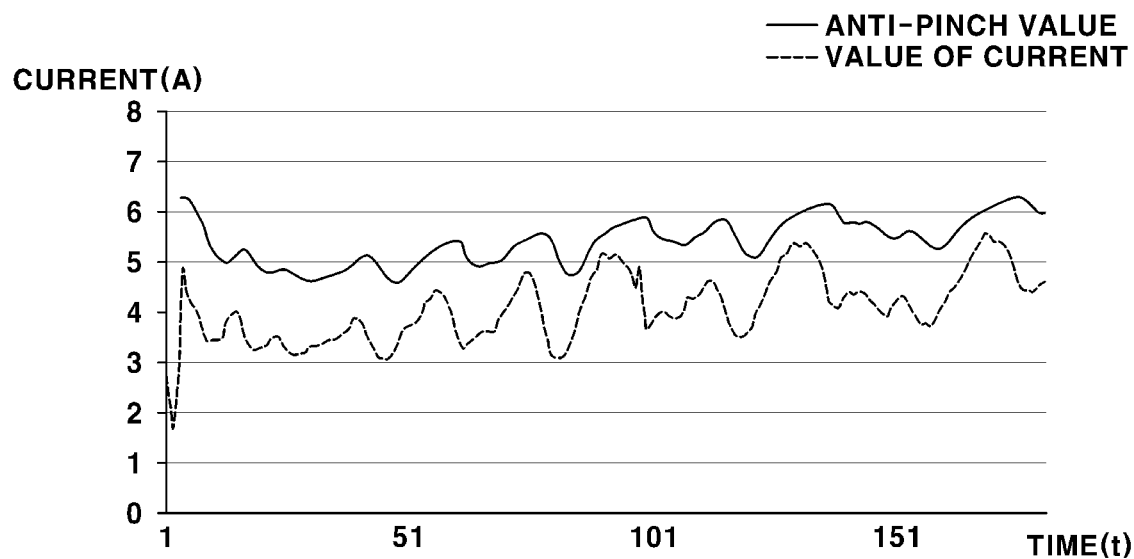

ANTI-PINCH CONTROL SYSTEM

CROSS-REFERENCE TO RELATED APPLICATION

This application claims under 35 U.S.C. § 119(a) the benefit of priority to Korean Patent Application No. 10-2019-0146686 filed on Nov. 15, 2019, the entire contents of which are incorporated herein by reference.

BACKGROUND

(a) Technical Field

The present disclosure relates to an anti-pinch control system for varying an anti-pinch value depending on a value of current consumed by a motor.

(b) Background Art

As an electronic apparatus for driving a seat for improving the convenience for a driver has been popularized, accidents have frequently occurred for reasons including carelessness of a user and malfunction of a device. To overcome the problem, various safety regulations have been established and applied with respect to an anti-pinch system for preventing an obstacle from being pinched. The anti-pinch system is a safety system that is applied to components of a vehicle that are driven in an electronic manner, such as a power window, a sunroof, or a seat, and that prevents a part of a human body or an obstruction from being pinched by an automatically driven component.

However, in a condition in which a load applied to a motor for driving a seat varies continuously, an anti-pinch value is fixedly set, and thus there is a problem in that driving of the seat is not stopped in situations in which a person is pinched by the seat.

In addition, the load applied to the motor may vary depending on the current position of the seat. Because an anti-pinch value is set to a fixed value in a general anti-pinch control system, there is a problem in that a change in the position of the seat is not appropriately applied.

SUMMARY OF THE DISCLOSURE

In one aspect, the present disclosure provides an anti-pinch control system for varying an anti-pinch value based on an average of values of current consumed by a motor.

In another aspect, the present disclosure provides an anti-pinch control system for measuring values of current consumed by a motor based on different measurement periods and varying an anti-pinch value based on an average of the values of current.

In a preferred embodiment, an anti-pinch control system includes a motor configured to generate driving force for moving a seat of a vehicle, a current measurement sensor configured to measure a value of the current generated by the motor, a database unit configured to store the values of current measured by the current measurement sensor, and a controller configured to vary an anti-pinch value of the seat based on an average of a plurality of values of current measured every preset measurement period for a predetermined time, stored in the database unit, wherein the plurality of values of current is values of current measured before the predetermined time based on a current time.

The controller may derive a value obtained by adding a preset value of current for recognizing pinch to an average of the plurality of values of current, as the anti-pinch value.

The controller may stop driving the seat when a value of current measured in real time by the current measurement sensor is equal to or greater than the anti-pinch value.

The controller may include a first calculator configured to derive averages of each of sets of values of current measured using each of the plurality of preset measurement periods, and a second calculator configured to derive minimum values among the averages of each of the sets of the values of current and to derive the anti-pinch value based on the minimum values.

The second calculator may derive a minimum value of values obtained by adding a preset value of current for recognizing pinch to the average, as the anti-pinch value.

The plurality of preset measurement periods may have different periods, and the first calculator may derive an average based on a value of current, a number of which increases as a measurement period decreases.

The controller may include a first calculator configured to derive averages of each of the sets of values of current using each of the plurality of preset measurement periods, and a second calculator configured to derive the anti-pinch value based on a multiple average obtained by applying different weights to an average of each of the sets of the values of current.

The multiple average may be a value obtained by adding the averages to which the weight is applied.

The second calculator may derive a value obtained by adding a preset value of current for recognizing pinch to the multiple average, as the anti-pinch value.

A period at which the motor rotates once may be longer than the preset measurement period.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 3 is a flowchart for explaining a method of deriving an anti-pinch value using a moving average method according to the present disclosure;

FIG. 4 is a graph showing an anti-pinch value derived using a moving average method;

FIG. 5 is a block diagram showing a modified example of an anti-pinch control system according to an embodiment of the present disclosure; and FIGS. 6A to 6D are graphs for explaining a method of deriving an anti-pinch value using a multiple moving average method according to the present disclosure.

DETAILED DESCRIPTION

Figure 1:
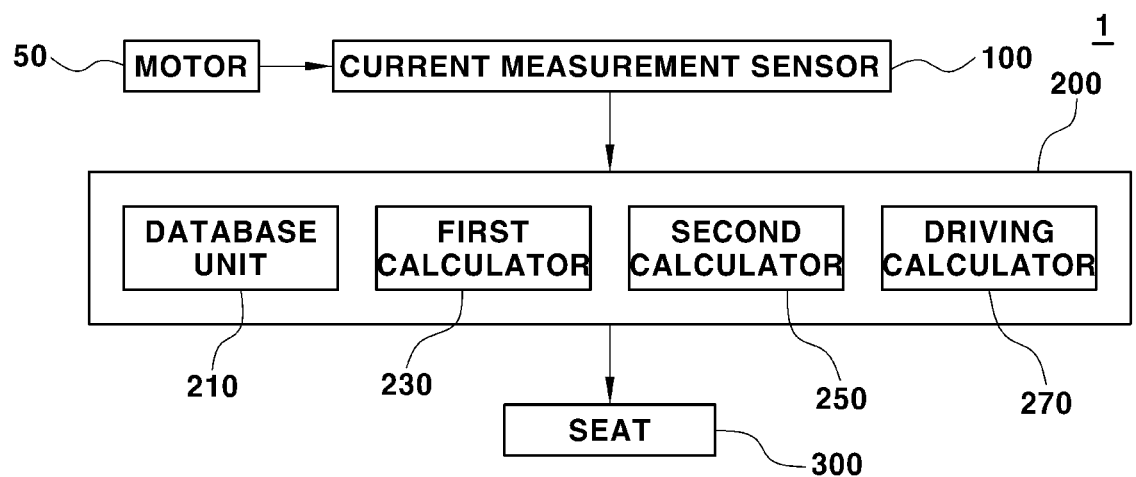
FIG. 1 is a block diagram showing an anti-pinch control system according to an embodiment of the present disclosure.

The attached drawings for illustrating exemplary embodiments of the present disclosure are to be referred to in order to gain a sufficient understanding of the present disclosure, the merits thereof, and the objectives accomplished by the implementation of the present disclosure. The present disclosure may, however, be embodied in many different forms, and should not be construed as being limited to the embodiments set forth herein; rather, these embodiments are provided so that this disclosure will be thorough and complete, and will fully convey the concept of the invention to one of ordinary skill in the art. Meanwhile, the terminology used herein is for the purpose of describing particular embodiments and is not intended to limit the invention. Like reference numerals in the drawings denote like elements.

Terms such as 'unit' or 'module', etc., should be understood to indicate units that process at least one function or operation and that may be embodied in a hardware manner, a software manner, or a combination of a hardware manner and a software manner.

Terms, such as "first", "second", and the like used in the specification may be used to distinguish the relevant elements using the reference relationship, and are not limited by the order.

The detailed description is used to exemplify the invention. The description herein is given to show exemplary embodiments of the present disclosure, and the invention may be used in various other combinations, changes, and environments. That is, the invention may be changed or modified within the scope of the concept of the invention disclosed in the specification, the equivalent scope of the given disclosure, and/or the scope of the technology or knowledge in the art. The described embodiment is the ideal embodiment for implementing the technological spirit of the invention, but may be changed in various forms required in detailed applications and use of the invention. Thus, the detailed description of the invention herein is merely exemplary, and is not intended to limit the invention. The following claims are to be interpreted as including other embodiments.

FIG. 1 is a block diagram showing an anti-pinch control system according to an embodiment of the present disclosure.

Referring to FIG. 1, an anti-pinch control system 1 may include a current measurement sensor 100, a controller 200, and a seat 300. The anti-pinch control system 1 may vary an anti-pinch value of the seat 300 in consideration of the amount of current required by a motor 50, which varies in real time depending on a load applied to the seat 300. The anti-pinch value may be a limiting value of the amount of current required by the motor 50 depending on a load applied to the seat 300.

The current measurement sensor 100 may measure a value of current generated by driving the motor 50. The value of current measured by the current measurement sensor 100 may be the amount of current required by the motor 50 depending on the load applied to the motor 50. When an excessive load is applied to the seat 300, this means that an object or a person is pinched by the seat 300. The current measurement sensor 100 may measure current consumed by the motor 50 in real time.

The controller 200 may include a database unit 210, a first calculator 230, a second calculator 250, and a driving controller 270. The database unit 210, the first calculator 230, the second calculator 250, and the driving controller 270 may be components that are distinguished for respective functions of the controller 200.

The database unit 210 may store the value of current measured by the current measurement sensor 100. The database unit 210 may also store information on the time at which the stored values of current are measured.

The first calculator 230 may derive an average of a plurality of values of current measured during a predetermined time before the current time. In this case, the first calculator 230 may calculate the average based on a plurality of values of current appropriate for a preset measurement period. The current measurement sensor 100 may measure current in real time. The first calculator 230 may derive an average of values of current that is measured recently based on the current time rather than deriving an average of values of accumulated current. For example, the preset measurement period may be any one of 0.2, 0.3, 0.5, 1, 2, and 4 seconds. The first calculator 230 may derive the average based on a value of current, the number of which increases as a measurement period decreases. For example, when a predetermined time is 4 seconds and the preset measurement period is 0.5 seconds, the first calculator 230 may derive the average based on 8 values of current measured within 4 seconds before the current time. In another example, when the predetermined time is 4 seconds and the preset measurement period is 1 second, the first calculator 230 may derive the average based on 4 values of current measured within 4 seconds before the current time.

The second calculator 250 may derive an anti-pinch value of the seat 300 based on the average calculated by the first calculator 230. The second calculator 250 may derive the anti-pinch value by adding a value of current for recognizing pinch to an average of a plurality of values of current, which are measured for the respective preset measurement periods. The value of current for recognizing pinch may be a predetermined constant. The value of current for recognizing pinch may be a value indicating an ideal difference between the anti-pinch value and a value of current measured in real time when pinch does not occur. For example, a designer may set the value of current for recognizing pinch to 1.65 A and the motor 50 may require current of 1.65 A when a load of 8 kgfm is applied.

The driving controller 270 may control the seat 300 based on the anti-pinch value derived by the second calculator 250. The driving controller 270 may stop driving the seat 300 when a value of current, which is measured in real time by the current measurement sensor 100, is equal to or greater than the anti-pinch value.

According to an embodiment of the present disclosure, the controller 200 may vary the anti-pinch value based on the value of current measured during a predetermined time based on the current time. A value of current required by the motor 50 may change depending on a load that varies in real time, and the controller 200 may measure a value of current in real time and may vary the anti-pinch value. Thus, the anti-pinch control system 1 may apply the current state of the motor 50 and may reset the anti-pinch value to a value of current having a value corresponding to the value of current required by the motor 50.

Figure 2:
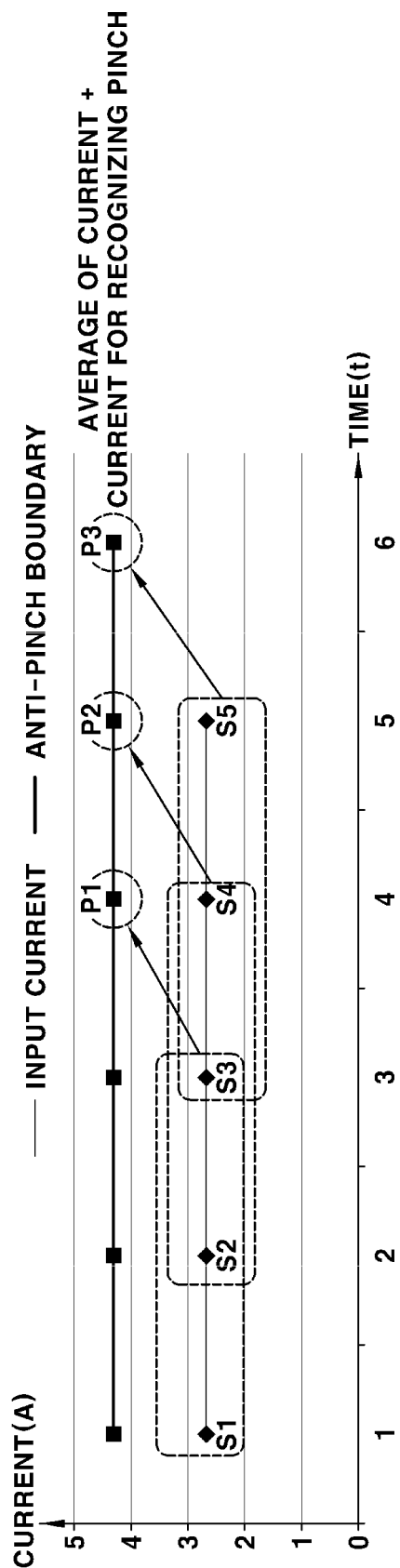
FIG. 2 is a diagram for explaining a method of deriving an anti-pinch value using a moving average method according to an embodiment of the present disclosure.

FIG. 2 is a diagram for explaining a method of deriving an anti-pinch value using a moving average method according to an embodiment of the present disclosure.

Referring to FIGS. 1 and 2, a predetermine time may be 3 seconds and a preset measurement period may be 1 second. In this case, a period at which the motor 50 rotates once may be longer than the preset measurement period. Thus, the preset measurement period may be set to a shorter period than the period at which the motor 50 rotates once.

The first calculator 230 may read a value of current measured before 1, 2, and 3 seconds based on the current time among values of current stored in the database unit 210. For example, the first calculator 230 may derive an average of a first value of current S1 measured before 3 seconds based on the current time, a second value of current S2 measured before 2 seconds based on the current time, and a third value of current S3 measured before 1 second based on the current time.

$$M = \frac{S_{k-n+1} + S_{k-n+2} \ldots S_k}{n}$$

n is the number of values of measured current, M is an average, and $s_k$ is a value of current.

The second calculator 250 may derive a first anti-pinch value P1 by adding value of current for recognizing pinch to the average. The driving controller 270 may change the anti-pinch value to the first anti-pinch value P1.

After a time corresponding to the preset measurement period elapses after the anti-pinch value is newly derived, the first calculator 230 may newly derive an average. For example, an average of the second value of current S2 measured before 3 seconds based on the current, the third value of current S3 measured before 2 seconds based on the current time, and a fourth value of current S4 measured before 1 second based on the current time may be derived. The second calculator 250 may derive a second anti-pinch value P2 by adding the value of current for recognizing pinch to the average. The driving controller 270 may change the anti-pinch value to the second anti-pinch value P2.

According to an embodiment of the present disclosure, the anti-pinch control system 1 may change the anti-pinch value every preset measurement period. Thus, the anti-pinch value to which the current state of the seat 300 is applied may be newly applied to the seat 300, thereby preventing a phenomenon in that driving of the seat 300 is not stopped or driving of the seat 300 is stopped in situations in which a person is pinched by the seat 300.

FIG. 3 is a flowchart for explaining a method of deriving an anti-pinch value using a moving average method according to the present disclosure. FIG. 4 is a graph showing an anti-pinch value derived using a moving average method.

Referring to FIGS. 3 and 4, a current measurement sensor may measure the amount of current, required by a motor, in real time. The measured amount of current may be stored in a controller (S100).

The controller may calculate an average based on the values of current that are measured every preset measurement periods for a predetermined time based on the current time. That is, the controller may calculate an average of values of current measured before the predetermined time based on the current time rather than calculating an average of values of current that are continuously measured and accumulated. A plot for an average is shown gentler than a plot for a value of current. A peak of the average is shown to be delayed by a predetermined time compared with a peak of the value of current. That is, the average may be a value to which variation of the value of current is applied, and the average may be used as data for setting a new anti-pinch value based on a value that is measured in the past (S200).

The controller may derive the anti-pinch value based on the average. The controller may derive a value obtained by adding the value of current for recognizing pinch to the average, as the anti-pinch value. When the average is obtained based on the average of values of accumulated current, a plot for the average may be shown gentler than a plot for the average of values of current measured before a predetermined time. When the anti-pinch value is obtained based on the average that is shown gently, there may be concern over a problem of deriving an anti-pinch value to which a value of current varying in real time is not appropriately applied. Thus, the anti-pinch control system according to an embodiment of the present disclosure may derive an anti-pinch value using only a value of current measured within a predetermined time, and thus may derive an anti-pinch value to which a value of current varying in real time (S300).

A driving controller may compare the value of current measured in real time and the anti-pinch value (S400).

When the value of current measured in real time is equal to or greater than an anti-pinch value, the driving controller may stop driving the seat. When the value of current measured in real time is equal to or greater than the anti-pinch value, this may mean that an object or a person is pinched by driving of the seat. Thus, the driving controller may stop driving the seat in order to prevent an object from being damaged or a person from being injured (S500).

When the value of current measured in real time is less than the anti-pinch value, the driving controller may continue to drive the seat. When the value of current measured in real time is less than the anti-pinch value, this may mean that an object or a person is not pinched by driving of the seat and a load applied to the motor is low (S600).

FIG. 5 is a block diagram showing a modified example of an anti-pinch control system according to an embodiment of the present disclosure. Repeated description will be omitted for brevity of the description.

Referring to FIG. 5, the controller 200 may include a plurality of first calculators 230. The first calculators 230 may read a value of current stored in the database unit 210 based on different measurement periods. That is, the first calculators 230 may derive averages based on preset different measurement periods.

The first calculators 230 may derive an average of each of sets of values of current measured using a plurality of respective of measurement periods. Values of current read in one preset measurement period may be defined as a set of a value of current. Thus, the value of current read at a plurality of preset measurement periods may be defined as sets of values of current. Each of the first calculators 230 may derive a plurality of averages based on the preset measurement periods. In this case, as a measurement period decreases, the first calculators 230 may derive the average based on many values of current. The first calculators 230 may derive the average based on the value of current measured for a predetermined period, and thus as a measurement period decreases, the number of values of current read by the database unit 210 may increase.

The second calculator 250 may derive the anti-pinch value based on an average of each of the sets of values of current.

For example, the second calculator 250 may add the value of current for recognizing pinch to averages of each of the sets of values of current. The second calculator 250 may derive the minimum value among the averages added to the value of current for recognizing pinch. The minimum value of the averages may refer to a value that is the closest to the value of current measured in real time. That is, when a difference between a value of current measured at a specific time and a calculated average is low, this may be interpreted as mean that the average is data to which variation in the value of current is applied. The second calculator 250 may derive the minimum values obtained through the above procedures, as the anti-pinch value.

Differently from the aforementioned example, the second calculator 250 may first drive the minimum value of averages of each of the sets of values of current, and may also derive the anti-pinch value by adding the value of current for recognizing pinch to the derived minimum value.

In another example, the second calculator 250 may apply different weights to respective averages of the sets of values of current, and may derive a multiple average to which all averages with weights applied thereto are added. For example, the number of sets of values of current may be 2, a measurement period at which a first set of values of current may be 0.3 seconds, and a measurement period at which a second set of values of current may be 1 second. The second calculator 250 may apply a weight of 0.8 to an average of the first set of values of current, and may apply a weight of 0.2 to an average of the second set of values of current. As a measurement period decreases, data to which a value of current that varies in real time may be derived, and thus the second calculator 250 may calculate the multiple average obtained by adding values obtained by applying a higher weight to the average of the first set of values of current having a shorter measurement period. The second calculator may derive a value obtained by adding a preset value of current for recognizing pinch to the multiple average, as the anti-pinch value.

According to an embodiment of the present disclosure, the anti-pinch control system 2 may derive the anti-pinch value based on a plurality of averages rather than deriving the anti-pinch value based on one average. Thus, the anti-pinch control system 2 may derive an anti-pinch value to which a value of current changed in real time is applied more appropriately.

The anti-pinch control system 2 may derive the anti-pinch value to which a value of current that varies in real is applied more appropriately by applying different weights to the averages.

FIGS. 6A to 6D are graphs for explaining a method of deriving an anti-pinch value using a multiple moving average method according to the present disclosure. Repeated description of FIG. 5 will be omitted for brevity of the description.

Referring to FIGS. 5 to 6D, the current measurement sensor 100 may measure the amount of current required by the motor 50 in real time. The measured amount of current may be stored in the database unit 210. The first calculators 230 may derive an average of each of sets of values of current measured using different at different measurement periods. For example, when a measurement period is 4 seconds (FIG. 6A) and a measurement period is 0.3 seconds (FIG. 6B), the first calculators 230 may derive the average of sets of values of current. Differently from the aforementioned example, the first calculators 230 may derive the average of sets of values of current based on three or more different periods. As seen from FIG. 6A, a waveform of an average having a relatively long measurement period is different from a waveform of a value of current, and as seen from FIG. 6B, a waveform of an average having a relatively short measurement period is similar to a waveform of a value of current. In the case of FIG. 6B, an average to which variation in current of the motor 50 is applied may be derived, and when an anti-pinch value is derived based on the average, the derived anti-pinch value may have a larger range of variation than an anti-pinch value derived in a condition of FIG. 6A. Because it is difficult to represent variation in current of the motor 50 by the anti-pinch value derived in the condition of FIG. 6A, the possibility that the anti-pinch control system 2 recognizes a value of current equal to or greater than the anti-pinch value may increase. In contrast, the anti-pinch value derived in the condition of FIG. 6B represents variation in current of the motor 50 in real time, and thus the possibility that the anti-pinch control system 2 recognizes a value of current equal to or greater than the anti-pinch value may decrease.

As seen from FIG. 6C, the second calculator 250 may derive a value by adding the value of current for recognizing pinch to the averages derived by the first calculators 230. A current of current measured in real time and values obtained by adding the value of current for recognizing pinch to the averages are separately shown in the graph.

As seen from FIG. 6D, the second calculator 250 may derive the minimum value of values obtained by adding the value of current for recognizing pinch to the average. The derived minimum value may be indicated by one line, and this may be an anti-pinch value.

Differently from the aforementioned example, the second calculator 250 may derive the minimum values of the average and may then derive an anti-pinch value by adding the value of current for recognizing pinch to the minimum value.

Differently from the aforementioned example, the second calculator 250 may apply different weights to respective averages and may then derive a value by adding the resulting values. The second calculator 250 may derive the anti-pinch value by adding the value of current for recognizing pinch to a value obtained by adding all averages to which a weight is applied.

According to an embodiment of the present disclosure, the anti-pinch control system may vary an anti-pinch value based on a value of current measured within a predetermined time based on the current time. A value of current required by a motor depending on a load that varies in real time changes, and thus the anti-pinch control system may apply the current state of the motor in real time and may reset an anti-pinch value to a value of current having a value corresponding to the value of current required by the motor.

According to an embodiment of the present disclosure, an anti-pinch control system may change an anti-pinch value every preset measurement period. Thus, an anti-pinch value to which the current state of a seat is applied may be newly applied to the seat, thereby preventing a phenomenon in that driving of the seat is not stopped or driving of the seat is stopped in situations in which a person is pinched by the seat.

The invention has been described in detail with reference to preferred embodiments thereof. However, terms or words used herein shall not be limited to having common or dictionary meanings, and components in the embodiments and the drawings of the specification are merely an exemplary embodiment of the present disclosure, and thus the scope of the present disclosure is not limited to the aforementioned embodiment, and various changes and modifications by one of ordinary skill in the art using the basic concept of the present disclosure defined in the following claims are contained in the scope of the present disclosure.

What is claimed is:

1. An anti-pinch control system comprising:
   a motor configured to generate driving force for moving a seat of a vehicle;
   a current measurement sensor configured to measure a value of the current generated by the motor;
   a database unit configured to store the values of current measured by the current measurement sensor; and
   a controller configured to vary an anti-pinch value of the seat based on an average of a plurality of values of current measured every preset measurement period for a predetermined time, stored in the database unit, wherein the plurality of values of current is values of current measured before the predetermined time based on a current time,
wherein the controller comprises:
a first calculator configured to derive averages of each of sets of values of current measured using each of the plurality of preset measurement periods; and
a second calculator configured to derive a minimum value of values obtained by adding a preset value of current for recognizing pinch to the average, as the anti-pinch value.

2. The anti-pinch control system of claim 1, wherein the controller stops driving the seat when a value of current measured in real time by the current measurement sensor is equal to or greater than the anti-pinch value.

3. The anti-pinch control system of claim 1, wherein the plurality of preset measurement periods have different periods; and
wherein the first calculator derives an average based on a value of current, a number of which increases as a measurement period decreases.

4. An anti-pinch control system comprising:
a motor configured to generate driving force for moving a seat of a vehicle;
a current measurement sensor configured to measure a value of the current generated by the motor;
a database configured to store the values of current measured by the current measurement sensor; and
a controller configured to vary an anti-pinch value of the seat based on an average of a plurality of values of current measured every preset measurement period for a predetermined time, stored in the database,
wherein the plurality of values of current is values of current measured before the predetermined time based on a current time,
wherein the controller comprises:
a first calculator configured to derive averages of each of the sets of values of current using each of the plurality of preset measurement periods; and
a second calculator configured to derive the anti-pinch value based on a multiple average obtained by applying different weights to an average of each of the sets of the values of current.

5. The anti-pinch control system of claim 4, wherein the multiple average is a value obtained by adding the averages to which the weight is applied.

6. The anti-pinch control system of claim 5, wherein the second calculator derives a value obtained by adding a preset value of current for recognizing pinch to the multiple average, as the anti-pinch value.

7. The anti-pinch control system of claim 1, wherein a period at which the motor rotates once is longer than the preset measurement period.

* * * * *